United States Patent [19]

Schüngel

[11] 4,443,016
[45] Apr. 17, 1984

[54] CLAMP RING DEVICE FOR THE SECURING AND REMOVAL OF A COVER OVER A PRESSURE VESSEL

[75] Inventor: Peter Schüngel, Bork, Fed. Rep. of Germany

[73] Assignee: Klöckner-Becorit GmbH, Castrop-Rauxel, Fed. Rep. of Germany

[21] Appl. No.: 515,597

[22] Filed: Jul. 21, 1983

[30] Foreign Application Priority Data

Oct. 30, 1982 [DE] Fed. Rep. of Germany ... 8230533[U]

[51] Int. Cl.³ .................. F61J 15/06; B65D 53/00
[52] U.S. Cl. .................................. 277/73; 277/27; 220/240; 220/378
[58] Field of Search .......... 220/240, 378, 319; 277/73, 3, 27, 12, 32

[56] References Cited

U.S. PATENT DOCUMENTS

| | | | |
|---|---|---|---|
| 1,831,572 | 11/1931 | MacArthur | 277/73 |
| 3,266,657 | 8/1966 | Stachiw | 220/378 X |
| 3,279,644 | 10/1966 | Robertson | 220/378 X |
| 4,216,876 | 8/1980 | Warnke | 220/319 |
| 4,331,175 | 5/1982 | Brake et al. | 220/319 X |
| 4,346,903 | 8/1982 | Heiermann | 277/58 |

OTHER PUBLICATIONS

Publication—Klöckner-Becorit GmbH, "Multiple Stud Tensioner for Nuclear Power Stations".
Publication—Klöckner-Becorit GmbH, "Manway Tensioner for Steam Generator and Pressurizer".
Publication—Klöckner-Becorit, "Handling Device for Multiple Stud Tensioners and Manway Covers".

*Primary Examiner*—Robert S. Ward
*Attorney, Agent, or Firm*—Watson, Cole, Grindle & Watson

[57] ABSTRACT

An annular clamp ring of aluminum material has a plurality of through bores for the reception of cover bolts and associated cover nuts to facilitate the securing and removal of a cover over a pressure vessel. The bores are of stepped diameter and high-pressure seals are provided in the ring bores and at the stepped diameter.

3 Claims, 3 Drawing Figures

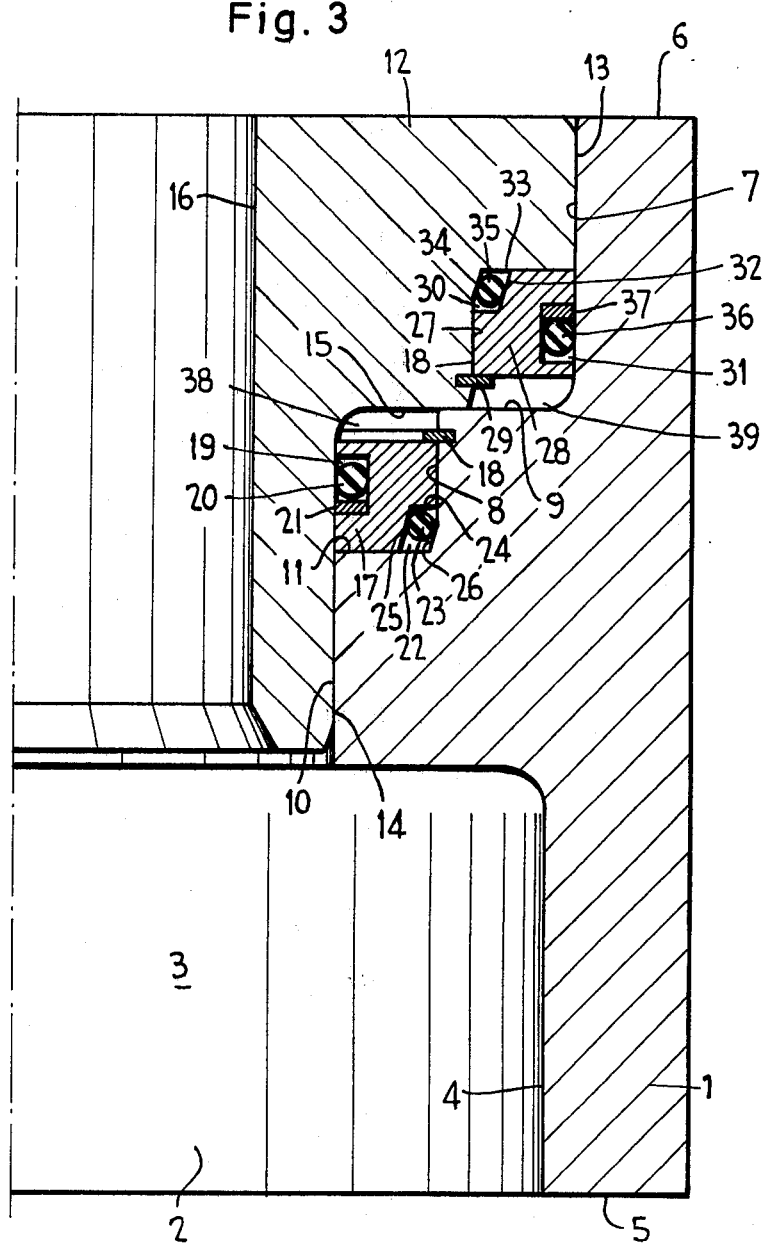

CLAMP RING DEVICE FOR THE SECURING AND REMOVAL OF A COVER OVER A PRESSURE VESSEL

BACKGROUND OF THE INVENTION

This invention relates to a clamp ring device for a plurality of bolt-clamp members to facilitate securing and removal of a cover over a pressure vessel, and includes an annular clamp ring having a plurality of evenly spaced coaxial through bores for the reception of cover bolts and associated cover nuts as well as for the guide of clamping pistons, the bores being sealed against the clamping pistons by the provision of high-pressure seals each having a dynamic packing ring and a static packing ring as well as a support ring between the two packing rings.

Bolt-clamp members for pressure vessel covers function the same as when provided for the securing and removal of reactor pressure vessel covers (see U.S. Pat. No. 4,216,876).

The proper functioning of sealed covers over steam generators or pressurizers largely depend upon a uniform pressure force exerted via the bolted joint from the cover on to the sealing surface. Hence, care must be exercised to assure that all the bolts are prestressed simultaneously and that each individual bolt transmits a proportional pressure force. The advantage of such bolt-clamp members is that a uniform bolt elongation is achieved by a uniformly high cylinder efficiency. Furthermore, time-consuming, strenuous and dangerous manual labor can be avoided. In addition, a considerable lessening in the time required for securing and removing the cover with reduced personnel requirements, is advantageous.

The clamp rings for bolt-clamp members used heretofore consisted of heat-treated steel since the ring itself defines a plurality of clamping cylinders for clamping pistons arranged to be axially displaceable therein. Therefore, the clamp ring material is stressed at high pressures, i.e., a pressure ranging from approximately 500 bar to its yield point.

Special problems arise when sealing cylinders at high pressure because the gap between the piston and cylinder to be sealed increases under the influence of the operating pressure due to the deformation of the elastic material.

SUMMARY OF THE INVENTION

It is therefore an object of the present invention to provide an improved clamp ring of the aforedescribed type which can be handled with greater ease without deleteriously affecting the proper functioning of the sealing of covers over steam generators or pressurizers.

According to the invention, the clamp ring consists essentially of aluminum material which has not been heretofore used for clamp rings of bolt-clamp members since aluminum was believed not sufficiently strong for this purpose. Also, a static calculation of the clamp ring by the formulas ordinarily used for the computation of the wall thickness of pipes leads to values from which one skilled in the art would conclude that aluminum cannot be considered as a material for the clamp ring. Nevertheless, experimentation has revealed that a clamp ring consisting essentially of aluminum has a sufficiently high compressive strength for the present purpose. This result is unexpected since the selection of aluminum as the material for the clamp ring of a bolt-clamp device was not predictable especially since former calculations have lead to unfavorable conclusions for the use of aluminum as a material for the clamp ring of a bolt-clamp device.

In addition, due to the different expansion coefficients between aluminum and steel, particular problems are to be taken into account with respect to the seals between the bores of the clamp ring and the clamping pistons of steel disposed therein for axial movement. It has been found, however, that such inherent difficulties that are to be expected do not arise.

In accordance with another feature of the invention, the bores of the clamp ring are capable of being reduced in diameter, and stepped cylindrical surfaces of the bores which accommodate clamping pistons are capable of being correspondingly reduced in diameter. And, a high-pressure seal arrangement is provided at one of the steps of each bore.

Further according to the invention, the seal arrangement includes an annular support ring, an elastomeric static seal ring, and an elastomeric dynamic seal ring, the former seal ring being located in an annular recess provided in the support ring having a conical wall with a portion of the confronting ring surface likewise being conical and parallel thereto so as to form a sealing chamber for the static packing ring.

BRIEF DESCRIPTION OF THE DRAWINGS

FIG. 3 is a view similar to FIG. 2 showing at an enlarged scale the details thereof.

DETAILED DESCRIPTION OF THE INVENTION

Figure 1:
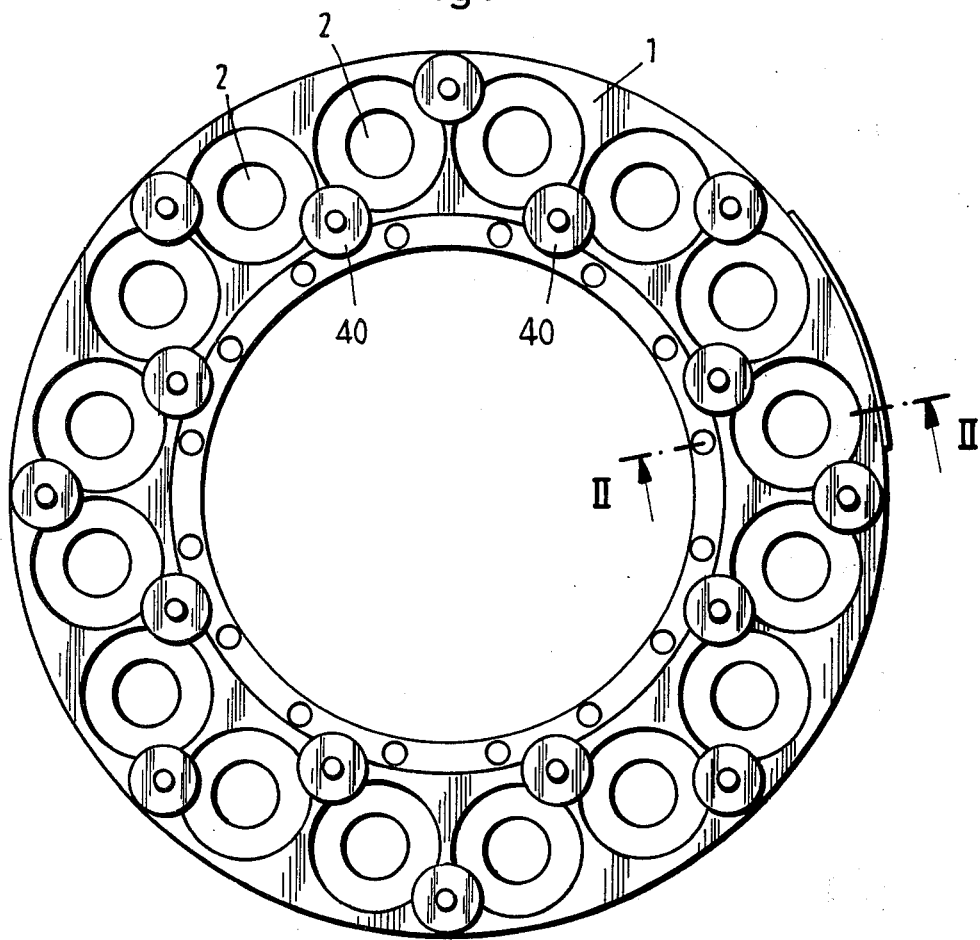
FIG. 1 is a top plan view of the clamp ring device according to the invention.

Turning now to the drawings wherein like reference characters refer to like and corresponding parts throughout the several views, a clamp ring 1 is shown in FIG. 1 as having a plurality of evenly spaced, coaxial, through bores 2 for the reception of cover bolts (not shown, but similar to that of U.S. Pat. No. 4,216,876) and their associated cover nuts which are located in a lower bore portion 3 which is defined by a cylindrical surface 4 of a predetermined first diameter. This cylindrical surface extends from one side 5 of the ring partially toward an opposite side 6 thereof. The remainder of bore 2 is defined by a stepped cylindrical surface of a second diameter 7 at opposite side 6, followed by a cylindrical surface of a third diameter 8 less than the second diameter so as to define a shoulder 9 between these two cylindrical surfaces, and followed by a cylindrical surface 10 of a fourth diameter less than the diameters of the first and third cylindrical surfaces 4 and 8. A shoulder 11 is defined between cylindrical surfaces 8 and 10, and both shoulders 9 and 11 are perpendicular to the central axis of bore 2.

A clamping ring piston 12 is received within each bore 2 at the stepped surface thereof for axial movement, the piston having outer cylindrical surfaces 13 and 14 respectively in engagement with cylindrical surfaces 7 and 10 of the bore. A shoulder 15 lying perpendicular to the central axis of the bore is defined between surfaces 13 and 14, and the piston has a central, through bore 16 through which the cover bolt (not shown) extends in a typical manner.

A high-pressure seal is disposed in a recess defined by cylindrical surfaces 8, 14 and shoulders 11, 15, and includes an annular support ring 17 in engagement with surfaces 8 and 11 and is locked into position by a snap ring 18, or the like. The support ring has an annular sealing chamber 19 formed therein defined together with surface 14 of the piston, and an annular, elastomeric dynamic seal ring 20 is disposed in chamber 19 in sealing engagement with surface 14. An annular spacer ring 21 may likewise be disposed within chamber 19.

Support ring 17 likewise has an annular sealing chamber 22 defined together with ring 1, and an annular elastomeric static seal ring 23 is disposed in sealing chamber 22 which is defined by an end face 24 on the support ring lying parallel to shoulder 11, an annular conical support surface 25 in the ring, and an annular conical support surface 26 located in a lower area of surface 8 and lying parallel to conical surface 25. This conical surface 25 extends from end face 24 and slopes in a direction radially inwardly therefrom.

Clamping ring piston 12 has a further annular recess 27 formed together with ring 1 for the reception of another high-pressure seal substantially the same as that disclosed in U.S. Pat. No. 4,346,903. Thus, the high-pressure seal comprises an annular support ring 28 held in place by a snap ring 29 or the like, and having annular sealing chambers 30, 31 respectively formed together with the piston and with the ring. Chamber 30 has a conical surface 32 sloping radially inwardly from an end face 33 of the chamber, and a conical surface 34 at the upper end of the wall of recess 27 is parallel to surface 32. An elastomeric, static seal ring 35 is disposed in chamber 30, and an elastomeric, dynamic seal ring 36 is disposed in chamber 31. A spacer ring 37 may likewise be disposed within chamber 31.

Ring 1 according to the invention is of aluminum material, and ring pistons 12 are of steel. Prior to assembly of the ring pistons within the ring 1, the high-pressure seals are assembled in place in the respective recesses of ring 1 and pistons 12. The dynamic seal rings and their spacer rings are disposed in the respective sealing chambers of their support rings 17 and 28, and the static seal rings are first disposed in engagement with surfaces 8 and the cylindrical surfaces of recesses 27 so that the back-up support rings, together with the dynamic seal rings in place, are then shifted axially into position until they are fully seated in place in the position shown in FIG. 3. In the process, the static seal rings slide along the conical surfaces of their respective sealing chambers 22 and 30 and are thereby caused to stretch to increased diameters, similarly as described in the aforementioned U.S. Pat. No. 4,346,903. The thus expanded static seal rings improve upon the seals between the piston and the support rings and, in turn, between the pistons and ring 1 which functions as a plurality of ring cylinders at surfaces 7 and 10. High-pressure spaces 38 and 39 are respectively located between support rings 17, 28 and shoulders 15, 9. Thus, upon the application of pressure to these spaces from a suitable source (not shown), clamping pistons 12 are axially shifted outwardly of their cylinders for tightening the clamping bolts and nuts for the sealing of a cover (not shown) to a pressure vessel.

Figure 2:
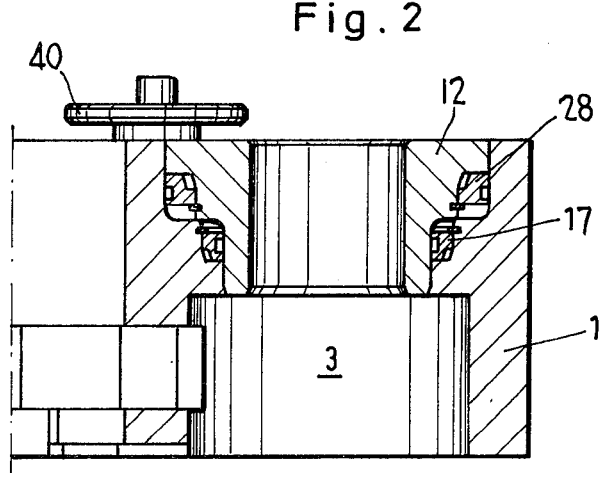
FIG. 2 is a cross-sectional view, at a slightly enlarged scale, taken substantially along the line II—II of FIG. 1.

As shown in FIGS. 1 and 2, retaining washers 40 are mounted on the upper surface of ring 1 at a spaced distance therefrom to limit the outward movement of clamping pistons 12 from clamping ring 1.

From the foregoing, it can be seen that the aluminum clamp ring according to the invention functions as a plurality of ring cylinders for the clamping ring pistons to facilitate securing and removal of the cover over a pressure vessel, while sealing between the clamping pistons and the aforedescribed support rings and, in turn, between the clamping pistons and the ring cylinders. Besides, the bores extending through the clamp ring may be of reduced diameter allowing for smaller diameter clamping bolts and nuts.

Obviously, many modifications and variations of the present invention are made possible in the light of the above teachings. It is therefore to be understood that within the scope of the appended claims the invention may be practiced otherwise than as specifically described.

What is claimed is:

1. A clamp ring device for a plurality of bolt-clamp members to facilitate the securing and removal of a cover over a pressure vessel, comprising an annular clamp ring consisting essentially of aluminum and having a plurality of evenly spaced coaxial through bores for the reception of cover bolts and associated cover nuts, each said bore being defined by a cylindrical surface of a predetermined first diameter for the reception of one of the cover nuts, said surface extending from one side of said ring partially toward the opposite side thereof, and the remainder of said each bore being defined by a stepped cylindrical surface of a second diameter at said opposite end followed by a third diameter less than said second diameter and followed by a fourth diameter less than said third and first diameters, a circular ring piston received within said each bore at said stepped surface thereof for axial movement, said piston having outer cylindrical surfaces respectively in engagement with said second and fourth diameter surfaces, high-pressure annular seal means disposed between said third cylindrical surface and said piston, said second and fourth diameter surfaces and the inner periphery of said seal means defining a stepped cylindrical bore for said piston, and said seal means comprising an annular support ring, an elastomeric static seal ring, and an elastomeric dynamic seal ring.

2. The device according to claim 1, wherein said support ring has at the inner periphery thereof a first annular recess, said dynamic seal ring being received in said recess.

3. The device according to claim 2, wherein said support ring has at the outer periphery thereof a second annular recess, said static seal ring being received in said second recess, one wall of said second recess lying perpendicular to the axis of said bore and another wall of said second recess being conical and radially sloping inwardly away from said one wall, a portion of said third diameter surface facing said another wall and lying parallel thereto.

* * * * *